United States Patent
Ma et al.

(10) Patent No.: US 10,545,763 B2
(45) Date of Patent: Jan. 28, 2020

(54) DETECTING DATA DEPENDENCIES OF INSTRUCTIONS ASSOCIATED WITH THREADS IN A SIMULTANEOUS MULTITHREADING SCHEME

(71) Applicant: Alibaba Group Holding Limited, George Town (KY)

(72) Inventors: Ling Ma, Hangzhou (CN); Sihai Yao, Hangzhou (CN); Lei Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 377 days.

(21) Appl. No.: 14/705,323

(22) Filed: May 6, 2015

(65) Prior Publication Data
US 2015/0324202 A1    Nov. 12, 2015

(30) Foreign Application Priority Data

May 7, 2014  (CN) .......................... 2014 1 0190737

(51) Int. Cl.
*G06F 9/38* (2018.01)
*G06F 9/30* (2018.01)

(52) U.S. Cl.
CPC .......... *G06F 9/384* (2013.01); *G06F 9/30145* (2013.01); *G06F 9/3851* (2013.01)

(58) Field of Classification Search
CPC .... G06F 9/384; G06F 9/30145; G06F 9/3838; G06F 9/3851; G06F 8/433
See application file for complete search history.

(56) References Cited

U.S. PATENT DOCUMENTS 5,226,126 A * 7/1993 McFarland ......... G06F 9/30003
                                                        712/217
5,404,552 A * 4/1995 Ikenaga ................ G06F 9/3869
                                                        712/216

(Continued)

OTHER PUBLICATIONS

Patterson, David A., and John L. Hennessy. Computer Organization and Design: The Hardware/Software Interface. 3rd ed. Burlington, MA: Morgan Kaufmann, n.d. Print. (3rd Edition pp. 439-440).*

*Primary Examiner* — Aimee Li
*Assistant Examiner* — Andrew J Cromer
(74) *Attorney, Agent, or Firm* — Van Pelt, Yi & James LLP

(57) ABSTRACT

Detecting data dependencies of instructions associated with threads in a simultaneous multithreading (SMT) scheme is disclosed, including: dividing a plurality of comparators of an SMT-enabled device into groups of comparators corresponding to respective ones of threads associated with the SMT-enabled device; simultaneously distributing a first set of instructions associated with a first thread of the plurality of threads to a corresponding first group of comparators from the plurality of groups of comparators and distributing a second set of instructions associated with a second thread of the plurality of threads to a corresponding second group of comparators from the plurality of groups of comparators; and simultaneously performing data dependency detection on the first set of instructions associated with the first thread using the corresponding first group of comparators and performing data dependency detection on the second set of instructions associated with the second thread using the corresponding second group of comparators.

17 Claims, 8 Drawing Sheets

(56) References Cited

U.S. PATENT DOCUMENTS

| | | |
|---|---|---|
| 5,416,913 A | 5/1995 | Grochowski et al. |
| 5,737,629 A | 4/1998 | Zuraski et al. |
| 5,778,248 A | 7/1998 | Leung |
| 5,937,202 A | 8/1999 | Crosetto |
| 6,058,466 A | 5/2000 | Panwar et al. |
| 6,550,001 B1* | 4/2003 | Corwin ................ G06F 9/3836 712/216 |
| 7,430,654 B2* | 9/2008 | Huang ................ G06F 9/3824 712/217 |
| 7,831,979 B2* | 11/2010 | Whalen ............... G06F 9/30054 718/108 |
| 2002/0091915 A1 | 7/2002 | Parady et al. |
| 2005/0177703 A1* | 8/2005 | Norden ................ G06F 9/3802 712/205 |
| 2006/0161735 A1* | 7/2006 | Kiyota ................ G06F 9/3004 711/129 |
| 2009/0132796 A1* | 5/2009 | Snyder ................ G06F 9/3004 712/229 |
| 2009/0144737 A1* | 6/2009 | Armstrong .......... G06F 9/30181 718/100 |
| 2010/0100712 A1 | 4/2010 | Mejdrich et al. |

\* cited by examiner

DETECTING DATA DEPENDENCIES OF INSTRUCTIONS ASSOCIATED WITH THREADS IN A SIMULTANEOUS MULTITHREADING SCHEME

CROSS REFERENCE TO OTHER APPLICATIONS

This application claims priority to People's Republic of China Patent Application No. 201410190737.4 entitled AN SMT-BASED CENTRAL PROCESSING UNIT AND A DEVICE FOR DETECTING DATA DEPENDENCIES OF INSTRUCTIONS, filed May 7, 2014 which is incorporated herein by reference for all purposes.

FIELD OF THE INVENTION

The present application relates to central processor technology. Specifically, the present application relates to a simultaneous multithreading (SMT) device for detecting data dependencies of instructions.

BACKGROUND OF THE INVENTION

A Central Processing Unit (CPU) is the computing and controlling core of the computer. The CPU's basic operating process comprises the following phases: instruction fetching, instruction decoding, instruction execution, and writing back. In the instruction fetching phase, instructions are extracted from storage or a cache. In the instruction decoding phase, different control signals are generated according to the types of fetched instructions. In the instruction execution phase, operands are used to execute instructions in functional components (execution units) in accordance with the control signals generated from the decoding phrase. Lastly, in the write-back phase, execution results are written back into storage or a register.

Several CPU performance-improving techniques have improved CPU throughput. Examples of such performance-improving techniques include pipelining, superscalar techniques, and superscalar-pipelining techniques. These techniques have the following in common: they increase the concurrency of instruction execution by increasing the number of instructions executed within a single clock cycle and therefore increase CPU execution efficiency. However, in reality, a CPU generally makes use of limited system architecture registers (also called "ISA registers" or "general registers") to save the operands and the results of executed instructions. Consequently, dependent relationships (also called "data dependency") may exist between instructions. For example, two instructions are dependent because they use the same register. Such dependency between the instructions will restrict parallel execution of the instructions. To mitigate this problem, a register renaming phase is introduced between the decoding and execution phases of the CPU operating process. The main task of the renaming phase is to eliminate false dependence (also called "erroneous dependence") between instructions with respect to register use. It is also necessary to screen for true dependence (also called "data dependency") between instructions. Data dependency occurs if the value of the source operand to be used in an execution of a subsequent instruction originates from a destination operand that is produced by a prior executed instruction, for example. The register renaming phase can be solved through renaming list mapping. Screening for data dependency can be performed through comparative assessment using a renaming comparator.

In addition, to improve the utilization of CPU execution units, modern CPUs have been configured to perform simultaneous multithreading (SMT), which combines instruction-level parallelism with thread-level parallelism. By duplicating the architectural state of the processor, a single physical CPU may simultaneously execute two or more independent threads that share the processor's execution units. Since instruction streams coming from two or more threads contain more independent instructions capable of parallel execution, the execution units can be more effectively used and shared, which increases CPU throughput.

In light of the fact that a CPU that incorporates an SMT mechanism has more independent instruction streams, if front-end instruction widths can be expanded (including the instruction fetching, decoding, and renaming stages), it becomes possible to obtain even more parallel processing instructions and thus make even fuller use of multiple execution units. Existing solutions are available to increase the throughput of the instruction fetching and decoding stages. For example, Intel CPUs incorporate level 0 caches that are used to store instructions that have already been decoded. In this way, when a CPU needs instructions, it can directly acquire the needed instructions from the level 0 cache. At the same time, the width for acquiring instructions can be changed from 16 bytes to 32 bytes.

Conventionally, the number of hardware comparing units required for data dependency detection in executing instructions is the square of the number of renaming instructions in each cycle. Put another way, if a comparing unit were implemented using a set of hardware comparators and n is the number of renaming instructions that is required to be executed during each clock cycle, then the number of hardware comparators that is needed to perform data dependency detection is n×n−n. As such, conventionally, increasing the instruction width of the renaming phase requires a large increase in the number of hardware comparators that is to be used. Without the addition of more hardware, conventionally, the renaming phase in Intel CPUs that are configured with the SMT functionality is limited to four instructions per each clock cycle, which could decrease the throughput of parallel instruction computing. As for IBM CPUs with the SMT functionality, in order to increase the renaming width from four instructions to six instructions per clock cycle, conventionally, the number of hardware comparators would need to be increased from (4×4−4=12) to (6×6−6=30). Not only does this increase CPU hardware cost, but also it increases hardware complexity. A more efficient technique for expanding the instruction width in the renaming phase is needed.

BRIEF DESCRIPTION OF THE DRAWINGS

Various embodiments of the invention are disclosed in the following detailed description and the accompanying drawings.

DETAILED DESCRIPTION

Figure 1:
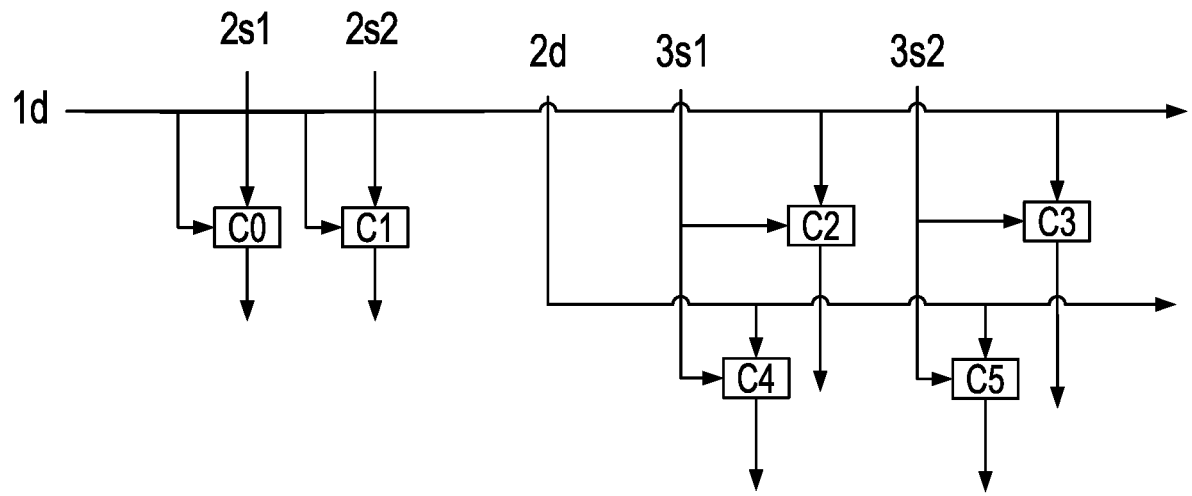
FIG. 1 is a diagram showing the conventional number of comparators that is needed to perform data dependency detection for three instructions belonging to a single thread.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Presently, CPUs make use of superscalar-pipelining techniques to increase throughput. Pipelining substantively lies in the overlapping execution of instructions as it reduces the execution time of each instruction. Superscalar technique consists of simultaneously issuing multiple instructions within the same clock cycle. Each pipeline generally includes the following basic pipeline phases: instruction fetching, instruction decoding, instruction renaming, instruction execution, and write-back. To give a further boost to parallelism, the above-described functional pipeline phases can be broken down further.

The main task in the instruction renaming phase is to eliminate false dependence (also called "erroneous dependence") including in write after write (WAW) and write after read (WAR) scenarios. It is also desirable to screen for data dependencies between instructions. Eliminating false dependence can be solved through renaming list mapping. Screening for data dependencies between instructions can be performed using comparators. In various embodiments, the number of instructions for which data dependency detection can be performed in a renaming operation in one clock cycle is referred to as the "renaming instruction width" (or the width of renaming).

Data dependency between instructions can limit the parallel/concurrent execution of instructions and thus affect the execution efficiency of the device. Data dependency exists between instructions if the source operand reference of an instruction that is to be executed later is the same as the destination operand reference of an instruction that is to be executed earlier. As used herein, a "source operand" comprises a data value on which an instruction is to execute and a "destination operand" comprises a data value that is produced by the execution of an instruction. As used herein, a "source operand reference" comprises a register address at which the data value of the source operand is stored and a "destination operand reference" comprises a register address at which the data value of the destination operand is stored. For example, a prior executed instruction writes data into a register. A later executed instruction then fetches the data from the same register (such a situation is also called read after write (RAW)). That is, the execution of the later instruction requires the execution result of the prior instruction. Thus, these two instructions are deemed to have a true dependent relationship in terms of execution order and therefore, data dependency exists between these two instructions.

Two instructions that have data dependency cannot be executed concurrently. Conventionally, two solutions are employed. The first solution is to execute the two instructions sequentially. That is, the operation associated with the later instruction is pushed back until the prior instruction has completed execution. The processing of the later instruction begins only after the prior instruction has written the execution result into the appropriate storage location. The second solution is a bypass technique. In the bypass technique, it is not necessary to wait for the prior instruction to write the result data into the appropriate storage location but rather, the needed data is fetched through a specially set-up data channel. For example, the result produced by the prior instruction is directly pushed to the source operand input port of an execution unit.

The following example explains how data dependency between instructions belonging to a single thread is detected using hardware comparators (which are logic circuits that compare two values). For example, data dependency is to be detected between the following two instructions of the single thread:

$a+b=c$      Instruction 1:

$d+e=f$      Instruction 2:

Of the two instructions belonging to the single thread, instruction 1 is to be executed first. In instruction 1, each of "a" and "b" is a source operand reference and "c" is a destination operand reference. In instruction 2, each of "d" and "e" is a source operand reference and "f" is a destination operand reference. To determine whether the execution of instruction 2 depends on the execution of instruction 1, each of source operand reference "d" (the register address of "d") and source operand reference "e" (the register address of "e") of instruction 2 is separately compared to destination operand reference "c" (the register address of "c") of instruction 1. The register addresses of each of the two source operands, "d" and "e," of instruction 2 is analyzed to determine whether each of the source operands has originated from the register address of destination operand "c" of instruction 1. As such, two comparisons are to be performed by two respective hardware comparators; the first comparator compares instruction 2's source operand reference "d" with instruction 1's destination operand reference "c"; and the second comparator compares instruction 2's source operand reference "e" with instruction 1's destination operand reference "c." If the result output by either one of the comparators is that the compared destination operand reference of instruction 1 and a respective source operand reference of instruction 2 are the same, then that means there is data dependency between the two instructions.

To be able to complete this data dependency detection of instructions 1 and 2 within one clock cycle, the number of hardware comparators that is needed is the same as the number of comparisons that need to be performed within the clock cycle. Therefore, in this example where two comparisons need to be performed between two instructions, two comparators are needed.

In another example, if the data dependency of three instructions belonging to a single thread is to be detected within one clock cycle, then not only does the destination operand reference of the instruction to be executed first (which is also referred to as the first instruction) need to be compared with each of the two source operand references of the instruction to be executed second (which is also referred to as the second instruction), the destination operand reference of the instruction also needs to be compared with each of the two source operand references of the instruction to be executed third (which is also referred to as the third instruction). Comparing the destination operand reference of the first instruction to each of the two source operand references of each of the second and third instructions would require (2×2=4) comparisons and therefore, four hardware comparators. Furthermore, the destination operand reference of the second instruction needs to be compared with each of the two source operand references of the third instruction. Comparing the destination operand reference of the second instruction to each of the two source operand references of the third instruction requires two comparisons and therefore, an additional two hardware comparators. As a result, to perform the data dependency detection among three instructions within one clock cycle, the total number of hardware comparators that is needed is (4+2=6).

FIG. 1 is a diagram showing the conventional number of comparators that is needed to perform data dependency detection for three instructions belonging to a single thread. As described above, conventionally, to detect, within one clock cycle, data dependency for three instructions that belong to a single thread, six hardware comparators are needed. In the example of FIG. 1, the six hardware comparators are labeled from "c0" through "c5," "$1d$" is a variable that represents the address of the destination operand of the first instruction, "$2s1$" is a variable that represents the address of the first source operand of the second instruction, and "$2s2$" is a variable that represents the address of the second source operand of the second instruction, "$2d$" is a variable that represents the address of the destination operand of the second instruction, "$3s1$" is a variable that represents the address of the first source operand of the third instruction, and "$3s2$" is a variable that represents the address of the second source operand of the third instruction.

Comparator "c0" compares the values stored in "$1d$" and "$2s1$" to determine whether the two addresses are the same and therefore result in a data dependency between the first and second instructions. Comparator "c1" compares the values stored in "$1d$" and "$2s2$" to determine whether the two addresses are the same and therefore result in a data dependency between the first and second instructions. Comparator "c2" compares the values stored in "$1d$" and "$3s1$" to determine whether the two addresses are the same and therefore result in a data dependency between the first and third instructions. Comparator "c3" compares the values stored in "$1d$" and "$3s2$" to determine whether the two addresses are the same and therefore result in a data dependency between the first and third instructions. Comparator "c4" compares the values stored in "$2d$" and "$3s1$" to determine whether the two addresses are the same and therefore result in a data dependency between the second and third instructions. Comparator "c5" compares the values stored in "$2d$" and "$3s2$" to determine whether the two addresses are the same and therefore result in a data dependency between the second and third instructions.

Figure 2:
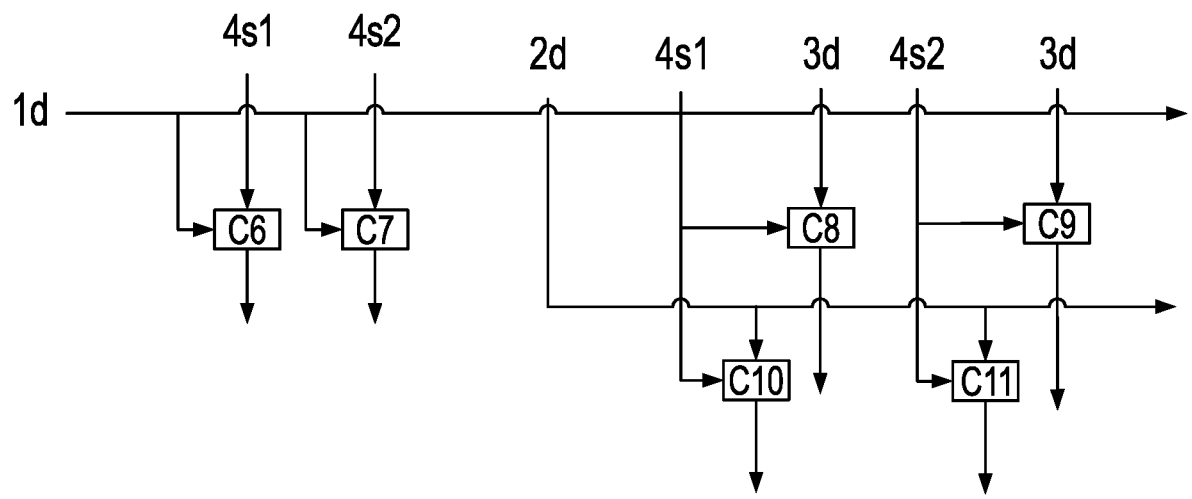
FIG. 2 is a diagram showing the conventional number of comparators that is needed to perform data dependency detection for a fourth additional instruction belonging to a single thread.

FIG. 2 is a diagram showing the conventional number of comparators that is needed to perform data dependency detection for a fourth additional instruction belonging to a single thread. In the example of FIG. 2, assume that four instructions, instead of just three instructions, belonged to a single thread. Since the conventional technique of performing data dependency among three instructions within one clock cycle was already described in the example of FIG. 1, the example of FIG. 2 describes the conventional technique of performing data dependency on the additional fourth instruction within the same clock cycle with respect to the other three instructions. Conventionally, to perform data dependency detection on the additional fourth instruction within the same clock cycle with respect to the other three instructions, the address of each of the two source operands of the fourth instruction would need to be compared to the address of each of the destination operand of the first instruction, the destination operand of the second instruction, and the destination operand of the third instruction. Therefore, widening the number of instructions on which to perform data dependency detection from three to four will add six additional hardware comparators.

In the example of FIG. 2, the six hardware comparators are labeled from "c6" through "c11," "$1d$" represents the address of the destination operand of the first instruction, "$4s1$" is a variable that represents the address of the first source operand of the fourth instruction, and "$4s2$" is a variable that represents the address of the second source operand of the fourth instruction, "$2d$" is a variable that represents the address of the destination operand of the second instruction, and "$3d$" is a variable that represents the address of the destination operand of the third instruction. Comparator "c6" compares the values stored in "$1d$" and "$4s1$" to determine whether the two addresses are the same and therefore result in a data dependency between the first and fourth instructions. Comparator "c7" compares the values stored in "$1d$" and "$4s2$" to determine whether the two addresses are the same and therefore result in a data dependency between the first and fourth instructions. Comparator "c8" compares the values stored in "$3d$" and "$4s1$" to determine whether the two addresses are the same and therefore result in a data dependency between the third and fourth instructions. Comparator "c9" compares the values stored in "$3d$" and "$4s2$" to determine whether the two addresses are the same and therefore result in a data dependency between the third and fourth instructions. Comparator "c10" compares the values stored in "2d" and "4s1" to determine whether the two addresses are the same and therefore result in a data dependency between the second and fourth instructions. Comparator "c11" compares the values stored in "2d" and "4s2" to determine whether the two addresses are the same and therefore result in a data dependency between the second and fourth instructions.

Since six comparators were needed to perform the data dependency detection for the first three instructions (as shown in the example of FIG. 1) and six more comparators are needed to perform the data dependency detection of the additional, fourth instruction, a total of (6+6=12) comparators are required to perform the data dependency detection for four instructions in one clock cycle.

By the same logic, if the data dependency among n instructions is to be detected, then the first instruction needs to be compared with the following n−1 instructions; the second instruction needs to be compared with the following n−2 instructions, . . . and the (n−1)th instruction needs to be compared with the final instruction. Moreover, two hardware comparators are required for each data dependency comparison between every two instructions. Therefore, conventionally, the total number of comparators required to perform data dependency detection for n instructions is: $2 \times ((n-1)+(n-2)+ \ldots +1) = n \times (n-1) = n^2 - n$.

It is thus clear that the conventional number of hardware comparators that is used to detect data dependency of instructions is not simply directly proportional to the number of instructions to be detected, but rather is directly proportional to the square of the number of instructions to be detected. Put another way, an increase in the instruction width for data dependency detection would generally require a large increase in the number of hardware comparators to be used. For example, when the instruction width for data dependency detection is expanded to six instructions, (6×6−6=30) hardware comparators will be required. Therefore, conventionally, the number of comparators needed for data dependency detection forms the primary bottleneck of the renaming phase and restricts instruction throughput of the instruction renaming phase. If it were possible to increase the instruction width for data dependency detection without having to add hardware comparators, or without having to add many of them, that could effectively improve the instruction width of the instruction renaming phase.

Embodiments of detecting data dependencies of instructions associated with simultaneous multithreading (SMT) are described herein. SMT is a technique that is capable of simultaneously executing instructions from multiple threads within one CPU clock cycle. The SMT technique combines superscalar with multithread processor characteristics. SMT takes advantage of the full potential of instruction-level parallelism (ILP) and thread-level parallelism (TLP). In a CPU for which SMT is enabled, only the threads to which dependent instructions belong will be affected in the case of long-delay operations, which may lower overall processor utilization. Other threads can continue to use the processor resources. For example, the data dependency between instructions of a certain thread may restrict a processor to only being able to issue two instructions per clock cycle. The instructions of an unrelated thread, however, can be used to fill an idle issue slot. Thus, SMT enables more instructions to be executed within one clock cycle, which increases the utilization of the processor issue slot and functional components, thereby increasing the overall instruction throughput of the CPU. Put another way, the implementation of SMT means that fewer additional hardware resources are required to achieve the same level of instruction throughput. A single set of hardware is set up for each running thread in order to save its execution status (i.e., thread context) and other components in the CPU can be shared by multiple threads.

One advantage of SMT is that the scheme makes use of the mutual independence of different threads to achieve full use of CPU functional components on a shared foundation. As will be described in further detail below, various embodiments described herein exploit the fact that data dependency does not exist between instructions belonging to different threads in an SMT scheme to expand the instruction width of renaming without the use of additional hardware comparators.

Figure 3:
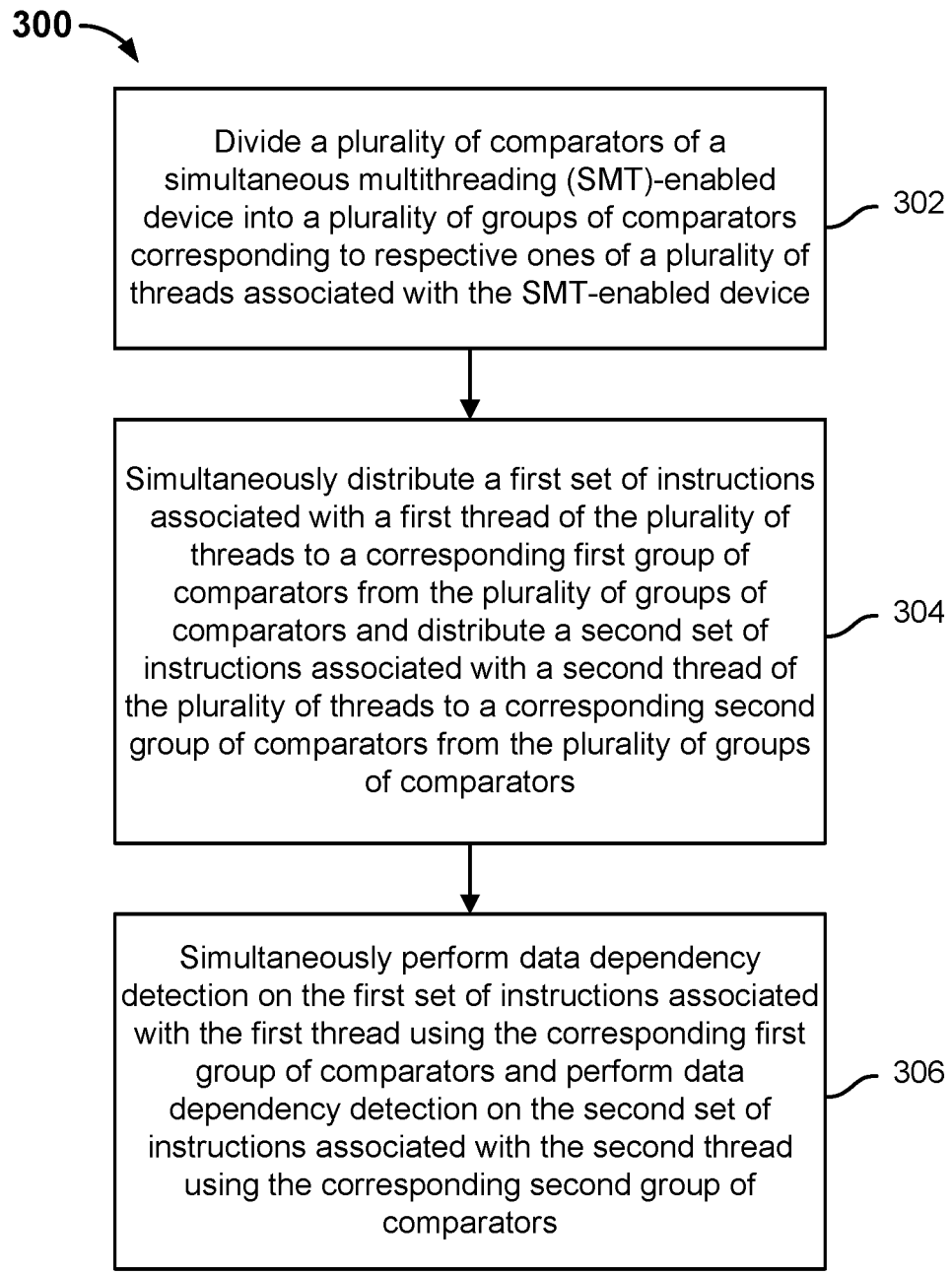
FIG. 3 is a flow diagram of a process for detecting data dependencies of instructions associated with threads in an SMT scheme.

FIG. 3 is a flow diagram of a process for detecting data dependencies of instructions associated with threads in an SMT scheme. In various embodiments, process 300 is implemented at a device. For example, the device comprises a central processing unit (CPU). In various embodiments, the device comprises a plurality of comparators. Generally, a comparator is configured to detect whether data dependency exists between a pair of instructions, where one instruction is configured to be executed earlier than the other instruction. In some embodiments, each comparator is implemented using software, hardware, or a combination of both.

The SMT functionality of a device can be enabled, in which multiple threads can be executed in parallel, or disabled, in which only a single thread can be executed. In some embodiments, the SMT functionality of a CPU can be disabled or enabled when the CPU is restarted. In various embodiments, process 300 is implemented at a device that is SMT-enabled (i.e., the SMT functionality of the device is enabled).

In various embodiments, each thread of the SMT-enabled device is configured to execute at least two instructions. Process 300 allows for the data dependency to be detected in the renaming stage between the at least two instructions of each thread of the SMT-enabled device to determine whether data dependency actually exists between the at least two instructions of each thread. Because it is known that generally, there is no data dependency between instructions of different threads of an SMT-enabled device, the instructions belonging to different threads of an SMT-enabled device can be checked simultaneously and in parallel for whether data dependency exists for instructions that belong to the same thread. In the event that data dependency does not actually exist between the at least two instructions of the same thread, then the at least two instructions can be executed at least partially concurrently/simultaneously during the instruction execution phase to increase efficiency.

At 302, a plurality of comparators of a simultaneous multithreading (SMT)-enabled device is divided into a plurality of groups of comparators corresponding to respective ones of a plurality of threads associated with the SMT-enabled device. In various embodiments, because the device is SMT-enabled, the device is operable to simultaneously execute multiple threads. The comparators of the device are divided into groups. The number of groups of comparators is equal to the number of threads that the device is configured to simultaneously execute when the SMT functionality is enabled. In various embodiments, the number of threads that the device is configured to simultaneously execute when the SMT functionality is enabled is fixed. In some embodiments, there are an equal number of comparators in each group. In some embodiments, at least some groups of comparators include a different number of comparators. For example, if the SMT-enabled device can simultaneously execute up to two threads and the device includes 12 comparators, then the 12 comparators could be divided into two groups of comparators, where each group corresponds to a respective thread and includes six comparators.

At 304, a first set of instructions associated with a first thread of the plurality of threads is distributed to a corresponding first group of comparators from the plurality of groups of comparators as a second set of instructions associated with a second thread of the plurality of threads is simultaneously distributed to a corresponding second group of comparators from the plurality of groups of comparators. Each set of two or more decoded instructions belonging to a first thread is distributed to the group of comparators corresponding to the first thread. Each set of two or more decoded instructions belonging to a second thread is distributed to the group of comparators corresponding to the second thread. Thus, after the instruction distribution, each group of comparators has been distributed the two or more instructions belonging to the thread to which the group of comparators corresponds.

In various embodiments, the decoded instructions belonging to various threads are stored in a storage device (e.g., a buffer or a memory) and the instructions are labeled/tagged with an identifier of the thread to which they belong. For example, the set of decoded instructions stored in the storage device belonging to Thread 1 are tagged with an identifier associated with Thread 1 and the set of decoded instructions stored in the storage device belonging to Thread 2 are tagged with an identifier associated with Thread 2. The thread identifiers associated with the stored instructions are used to distribute the appropriate set of instructions to the group of comparators corresponding to each thread.

At 306, data dependency detection is performed on the first set of instructions associated with the first thread using the corresponding first group of comparators simultaneously as data dependency detection is performed on the second set of instructions associated with the second thread using the corresponding second group of comparators. Each group of comparators is configured to perform data dependency detection on the set of instructions that belongs to the corresponding thread. A comparator is configured to receive two register addresses (or sometimes referred to as "operand references"), one of which belongs to the destination operand of an instruction that is to be executed earlier and the other belongs to the source operand of another instruction that is to be executed later. The comparator is configured to compare the two input register addresses to determine whether they are the same and output the result of the comparison. The output comprising the result of the determination could be either that the two received register addresses are the same and therefore, data dependency does exist between the two instructions, or the two received register addresses are not the same and therefore, data dependency does not exist between the two instructions.

Zero or more of the comparators in each group can output a determination result that indicates that data dependency exists between two instructions belonging to the corresponding thread. In the event that a comparator of a group outputs a determination result that indicates that data dependency does not exist between two particular instructions belonging to the corresponding thread, then it might be possible to execute at least those two instructions of that thread partially concurrently to improve the execution efficiency of the device. Otherwise, in the event that a comparator of a group outputs a determination result that indicates that data dependency does exist between two particular instructions belonging to the corresponding thread, then it would not be possible to execute at least those two instructions of that thread partially concurrently.

For example, a comparator can receive a destination operand reference of Instruction 1 and a source operand reference of Instruction 2, where Instruction 1 and Instruction 2 belong to the same thread. If the destination operand reference of Instruction 1 is the same as the source operand reference, then the comparator would output the determination result that data dependency exists between Instruction 1 and Instruction 2. As a consequence, Instruction 1 and Instruction 2 cannot be executed at least partially in parallel/concurrently.

As such, in the renaming phase as described by process 300, different groups of comparators mutually and independently perform data dependency detection on sets of instructions belonging to different respective threads within one clock cycle. For example, if group A of comparators corresponds to Thread 1 and if group B of comparators corresponds to Thread 2, then group A of comparators can perform data dependency detection on the instructions belonging to Thread 1 independently and simultaneously as group B of comparators performs data dependency detection on the instructions belonging to Thread 2, within the same clock cycle.

As described in process 300, the instructions of separate threads of an SMT-enabled device can be checked for data dependency simultaneously, which increases the total number of instructions across the multiple threads of the SMT-enabled device for which data dependency can be detected during the instruction renaming phase.

Figure 4:
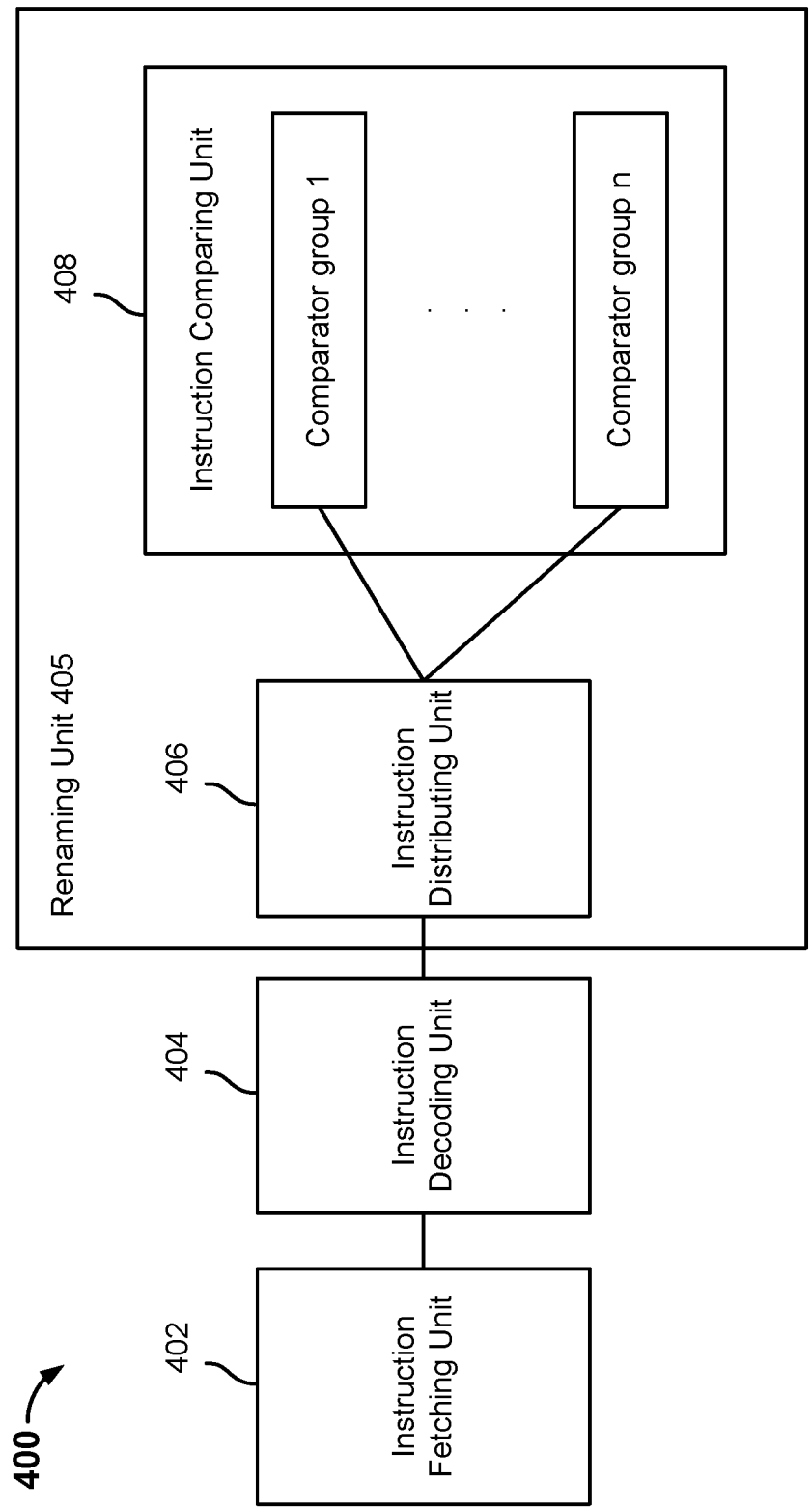
FIG. 4 is a diagram showing an embodiment of a central processing unit (CPU) configured to detect data dependencies of instructions belonging to one or more threads.

FIG. 4 is a diagram showing an embodiment of a central processing unit (CPU) configured to detect data dependencies of instructions belonging to one or more threads. CPU 400 includes instruction fetching unit 402, instruction decoding unit 404, and renaming unit 405. Renaming unit 405 further includes instruction distributing unit 406 and instruction comparing unit 408. Each of instruction fetching unit 402, instruction decoding unit 404, renaming unit 405, instruction distributing unit 406, and instruction comparing unit 408 is implemented using software, hardware, or a combination of software and hardware. In some embodiments, circuit components such as logical gates, multiplexers, registers, transistors, etc. are used to implement the functions of these units.

CPU 400 is configured with an SMT functionality. In some embodiments, process 300 of FIG. 3 is implemented at CPU 400 when CPU 400 is SMT-enabled. The following describes the configurations of CPU 400 when CPU 400 is SMT-enabled in accordance with some embodiments:

During the instruction renaming phase, instruction fetching unit 402 is configured to fetch instructions from an instruction cache. Instruction decoding unit 404 is configured to decode instructions output by instruction fetching unit 402. In some embodiments, instruction decoding unit 404 is configured to store the decoded instructions in a storage device (e.g., a buffer or a memory). Instruction distributing unit 406, of renaming unit 405, is configured to fetch the stored decoded instructions and simultaneously distribute the decoded set of instructions of each of the multiple threads that was output by instruction decoding unit 404 to a comparator group in instruction comparing unit 408, of renaming unit 405, that corresponds to that thread. In various embodiments, instruction distributing unit 406 is configured to distribute the decoded instructions belonging to a thread to the group of comparators that corresponds to that thread based at least in part on the thread identifier associated with the instructions. Instruction comparing unit 408 includes a plurality of comparators that is divided into as many groups of comparators as there are threads in the SMT scheme of CPU 400. Each group of comparators of instruction comparing unit 408 is assigned to perform data dependency detection and output corresponding determination results on the instructions belonging to a thread that corresponds to that group of comparators. In various embodiments, each group of comparators performs data dependency detection on the instructions of a corresponding thread mutually independently from the other groups of comparators.

In some embodiments, CPU 400 further comprises: an execution unit that is configured to execute the renamed instructions output by renaming unit 405, a write-back unit that is configured to execute write-backs of results to storage or registers, and queues configured to cache instructions within each functional unit. However, the execution unit, the write-back unit, and the queues are not shown in the example of FIG. 4.

When the SMT functionality is enabled for CPU 400, the comparators of instruction comparing unit 408 are divided into groups, where each group of comparators is assigned to perform data dependency detection, within one clock cycle of the renaming phase, on the set of instructions belonging to a different thread. To ensure that instruction comparing unit 408 can perform data dependency detection of instructions of different threads within a single clock cycle, in various embodiments, instruction fetching unit 402 and instruction decoding unit 404 are configured to perform instruction fetching and decoding, respectively, as described below:

In existing SMT-based CPUs, an instruction fetching unit may use different instruction fetching strategies based on values from a multiple thread program to fetch instructions from a cache. Examples include random method instruction fetching, polling instruction fetching, and instruction fetching that uses an Icount strategy, i.e., preferentially selecting the threads that occupy the fewest queue items in the CPU. Each of the instruction fetching strategies described above has its own characteristics. Because instruction comparing unit 408 in an SMT scheme needs to make full use of the data independence between instructions of different threads, in various embodiments, instruction fetching unit 402 is configured to use a polling approach to fetch the sets of instructions belonging to multiple threads. For example, instructions are fetched by separately polling from two simultaneous executable threads that are supported by the SMT-enabled CPU 400 within one clock cycle. For example, four instructions are fetched from each thread within one clock cycle.

Correspondingly, instruction decoding unit 404 is configured to using polling to decode sets of instructions belonging to separate threads. In some embodiments, instruction decoding unit 404 is configured to place decoded instructions in one or more decoded instruction queues. In some embodiments, one decoded instruction queue is used to store the decoded sets of instructions belonging to multiple threads. In some embodiments, multiple decoded instruction queues are used, where each queue stores the decoded set of instructions belonging to a corresponding thread.

Instruction distributing unit 406, of renaming unit 405, is configured to fetch decoded sets of instructions from the decoded instruction queue(s) and distribute the decoded sets of instructions according to the thread to which each decoded set of instructions belongs. Specifically, instruction distributing unit 406 is configured to distribute a decoded set of instructions to a corresponding comparator group of instruction comparing unit 408. For example, if the SMT scheme supports two threads, Thread 1 and Thread 2, instruction distributing unit 406 is configured to distribute the decoded set of instructions belonging to Thread 1 to a comparator group that is assigned to Thread 1 and distribute the decoded set of instructions belonging to Thread 2 to another comparator group that is assigned to Thread 2. In various embodiments, each decoded set of instructions is tagged with the thread identifier of the thread to which it belongs.

Figure 5:
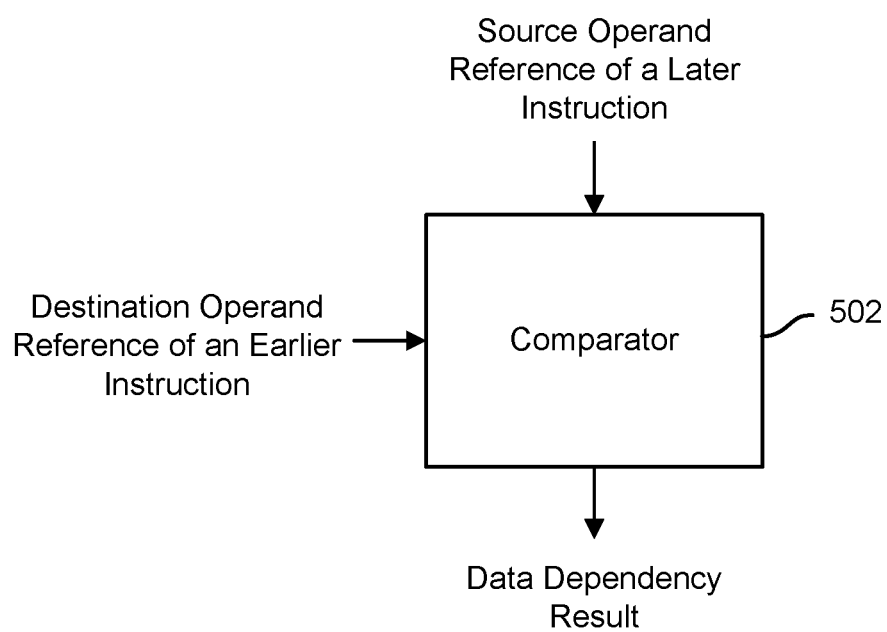
FIG. 5 is a diagram showing an example of a comparator.

Instruction comparing unit 408 comprises a plurality of comparators configured to perform data dependency detection between instructions belonging to different threads of the SMT-enabled CPU 400. FIG. 5 is a diagram showing an example of a comparator. In some embodiments, each comparator of instruction comparing unit 408 of system 400 of FIG. 4 is implemented using the example of FIG. 5. Comparator 502 of FIG. 5 can be implemented using software, hardware, or a combination of both software and hardware. The example of FIG. 5 shows comparator 502 that is configured to determine whether data dependency exists between two instructions belonging to the same thread and where one instruction is configured to be executed earlier than the other instruction. As shown in FIG. 5, comparator 502 has two input terminals and one output terminal. One of the input terminals receives the destination operand reference of the earlier instruction and the other input terminal receives the source operand reference of the later instruction. Comparator 502 is configured to compare the destination operand reference of the earlier instruction and source operand reference of the later instruction to determine whether the two references (e.g., register addresses) are the same. Comparator 502 is configured to output the determination result of the comparison. In the event that the destination operand reference of the earlier instruction and source operand reference of the later instruction are the same, comparator 502 is configured to output a signal or other indication that data dependency does exist between the two input references. Otherwise, in the event that the destination operand reference of the earlier instruction and source operand reference of the later instruction are not the same, comparator 502 is configured to output a signal or other indication that data dependency does not exist between the two input references.

In the examples described herein of CPUs that exercise number management over registers, the destination operand reference and the source operand reference refer to register numbers for writing or fetching operand data values.

As described above, the plurality of comparators of instruction comparing unit 408 are divided into at least two mutually independent groups. The number of groups of comparators is equal to the number of threads that are supported by the SMT functionality of CPU 400. Each group of comparators is configured to correspondingly perform data dependency detection between instructions of a corresponding one of the threads that are supported by the SMT functionality of CPU 400. Comparators of different groups are configured to perform data dependency detection between instructions belonging to different threads that are supported by the SMT functionality of CPU 400.

Due to the characteristic of the SMT functionality that instructions belonging to simultaneously executed threads are generally mutually independent, the different groups of comparators of instruction comparing unit 408 that correspond to respective threads can perform data dependency detection simultaneously and do not need to detect data dependency between instructions belonging to different threads during the instructions renaming phase. Thus, the mutually independent feature of the SMT functionality is exploited to efficiently use the comparators of an SMT-enabled CPU to increase the renaming instruction width.

Instruction distributing unit 406 is configured to obtain the decoded sets of instructions output by instruction decoding unit 404 and simultaneously distribute them according to the threads to which they belong. Instruction distributing unit 406 distributes the decoded set of instructions belonging to Thread 1 to the comparator group assigned to Thread 1 and distributes the decoded set of instructions belonging to Thread 2 to the comparator group assigned to Thread 2. The comparator group assigned to Thread 1 is configured to perform data dependency between the decoded set of instructions of Thread 1 and the comparator group assigned to Thread 2 is configured to perform data dependency between the decoded set of instructions assigned to Thread 2. As described above, the number of groups of comparators is the same as the number of threads supported following SMT functionality of CPU 400.

Currently, many CPUs have 12 hardware comparators and that each SMT-enabled CPU is generally configured to simultaneously execute up to two threads. Therefore, for example, SMT-enabled CPU 400 is configured to have 12 hardware comparators and is also operable to simultaneously execute up to two threads. As such, the 12 comparators in instruction comparing unit 408 can be divided into two groups, each corresponding to a respective thread of CPU 400 and where each of the first and second comparator groups include six comparators.

Figure 6A:
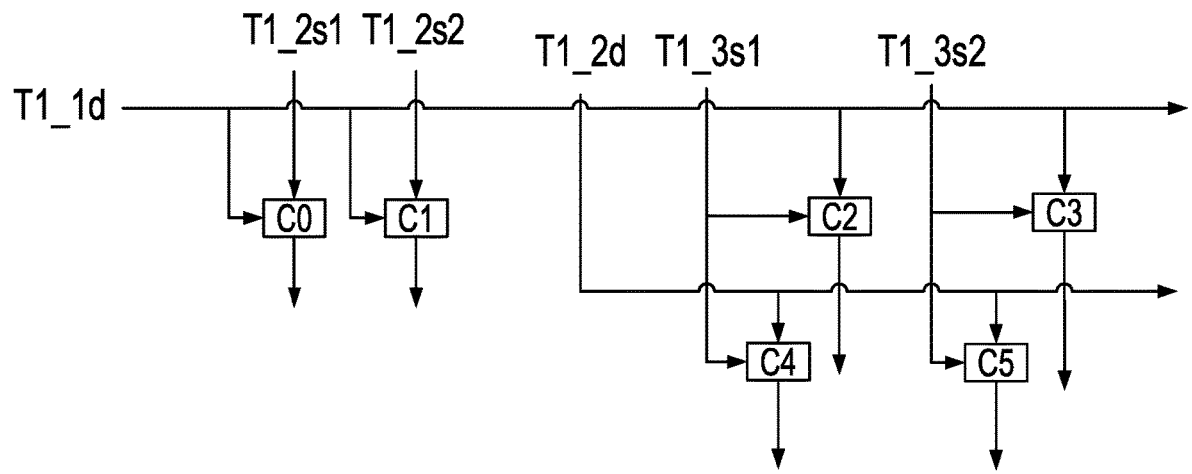
FIGS. 6A and 6B show diagrams of two groups of comparators that are configured to perform data dependency detection on instructions belonging to two respective threads of an SMT-enabled CPU.
Figure 6B:
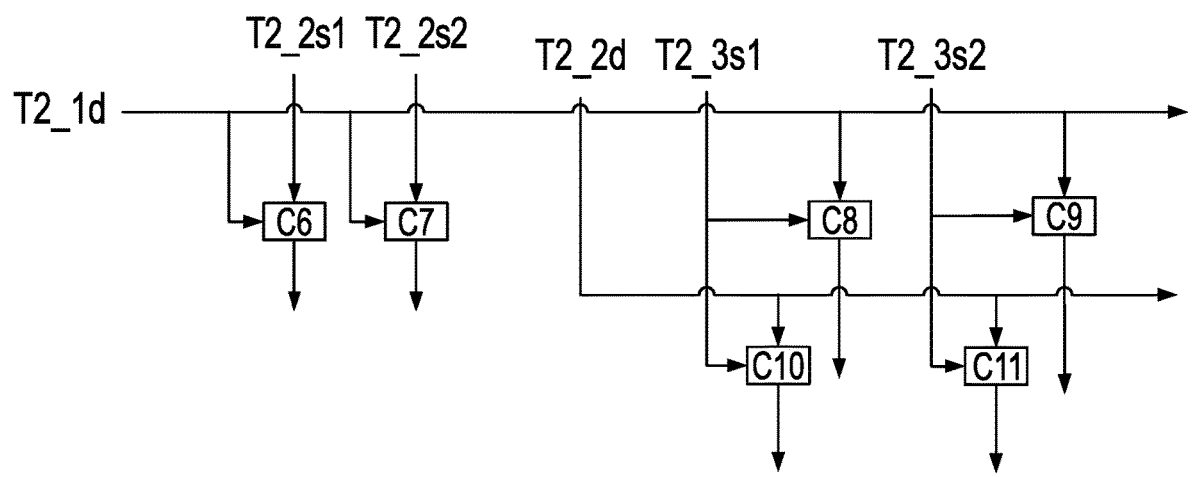

FIGS. 6A and 6B show diagrams of two groups of comparators that are configured to perform data dependency detection on instructions belonging to two respective threads of an SMT-enabled CPU. In the examples of FIGS. 6A and 6B, the two threads of the SMT-enabled CPU are Thread 1 and Thread 2. Each of Thread 1 and Thread 2 are associated with a decoded set of three instructions. In the example of FIGS. 6A and 6B, the SMT-enabled CPU includes 12 comparators, c0 through c11. The 12 comparators are divided into two groups corresponding respectively to Threads 1 and 2. As shown in FIG. 6A, the first group of comparators including comparators c0 through c5 is assigned to perform data dependency detection of the decoded set of three instructions belonging to Thread 1 and as shown in FIG. 6B, the second group of comparators including comparators c6 through c11 is assigned to perform data dependency detection of the decoded set of three instructions belonging to Thread 2.

In FIG. 6A, "T1_1$d$" is a variable that represents the destination operand reference of the first instruction of Thread 1, "T1_2$s1$" is a variable that represents a first source destination operand reference of the second instruction of Thread 1, "T1_2$s2$" is a variable that represents a second source destination operand reference of the second instruction of Thread 1, "T1_2$d$" is a variable that represents the destination operand reference of the second instruction of Thread 1, "T1_3$s1$" is a variable that represents a first source destination operand reference of the third instruction of Thread 1, and "T1_3$s2$" is a variable that represents a second source destination operand reference of the third instruction of Thread 1. Comparator "c0" compares the values stored in "T1_1$d$" and "T2_2$s1$" to determine whether the two references are the same and therefore result in a data dependency between the first and second instructions belonging to Thread 1. Comparator "c1" compares the values stored in "T1_1$d$" and "T1_2$s2$" to determine whether the two references are the same and therefore result in a data dependency between the first and second instructions belonging to Thread 1. Comparator "c2" compares the values stored in "T1_1$d$" and "T1_3$s1$" to determine whether the two references are the same and therefore result in a data dependency between the first and third instructions belonging to Thread 1. Comparator "c3" compares the values stored in "T1_1$d$" and "T1_3$s2$" to determine whether the two references are the same and therefore result in a data dependency between the first and third instructions belonging to Thread 1. Comparator "c4" compares the values stored in "T1_2$d$" and "T1_3$s1$" to determine whether the two references are the same and therefore result in a data dependency between the second and third instructions belonging to Thread 1. Comparator "c5" compares the values stored in "T1_2$d$" and "T1_3$s2$" to determine whether the two references are the same and therefore result in a data dependency between the second and third instructions belonging to Thread 1.

In FIG. 6B, "T2_1$d$" is a variable that represents the destination operand reference of the first instruction of Thread 2, "T2_2$s1$" is a variable that represents a first source destination operand reference of the second instruction of Thread 2, "T2_2$s2$" is a variable that represents a second source destination operand reference of the second instruction of Thread 2, "T2_2$d$" is a variable that represents the destination operand reference of the second instruction of Thread 2, "T2_3$s1$" is a variable that represents a first source destination operand reference of the third instruction of Thread 2, and "T2_3$s2$" is a variable that represents a second source destination operand reference of the third instruction of Thread 2. Comparator "c6" compares the values stored in "T2_1$d$" and "T2_2$s1$" to determine whether the two references are the same and therefore result in a data dependency between the first and second instructions belonging to Thread 2. Comparator "c7" compares the values stored in "T2_1$d$" and "T2_2$s2$" to determine whether the two references are the same and therefore result in a data dependency between the first and second instructions belonging to Thread 2. Comparator "c8" compares the values stored in "T2_1$d$" and "T2_3$s1$" to determine whether the two references are the same and therefore result in a data dependency between the first and third instructions belonging to Thread 2. Comparator "c9" compares the values stored in "T2_1$d$" and "T2_3$s2$" to determine whether the two references are the same and therefore result in a data dependency between the first and third instructions belonging to Thread 2. Comparator "c10" compares the values stored in "T2_2$d$" and "T2_3$s1$" to determine whether the two references are the same and therefore result in a data dependency between the second and third instructions belonging to Thread 2. Comparator "c11" compares the values stored in "T2_2$d$" and "T2_3$s2$" to determine whether the two references are the same and therefore result in a data dependency between the second and third instructions belonging to Thread 2.

The group of six comparators of c0 through c5 of FIG. 6A can perform data dependency detection on the three instructions of Thread 1 simultaneously as the group of six comparators of c6 through c11 of FIG. 6B can perform data dependency detection on the three instructions of Thread 2. Thus, the two comparator groups of FIGS. 6A and 6B can simultaneously detect the data dependency of a total of six instructions. By dividing the 12 comparators into groups that each corresponds to a thread of an SMT scheme, the detection of data dependency of six instructions is achieved within a single clock cycle, as compared to the conventional technique of using 12 comparators to detect the data dependency of only four instructions. Therefore, FIGS. 6A and 6B illustrate that according to various embodiments described herein, the operating efficiency of an SMT-enabled CPU can be effectively improved by 50%, such that the instruction width for data dependency detection in the renaming phase can be increased without adding additional comparators.

While the examples above described that the SMT-enabled CPU 400 is configured to simultaneously execute up to two threads and include 12 comparators, in other examples and in actual implementation, CPU 400 may be configured to simultaneously execute up to more than two threads and/or include more or fewer than 12 comparators. For example, the SMT-enabled CPU 400 can have 12 comparators in instruction comparing unit 408 and is also configured to simultaneously execute up to four threads. In such an example, the 12 comparators of instruction comparing unit 408 can be divided into four groups to correspond to the respective four threads. However, regardless of how many threads the SMT-enabled CPU 400 is configured to execute up to and/or how many comparators the SMT-enabled CPU 400 is configured to include, so long as the comparators in instruction comparing unit 408 are divided into multiple groups that correspond to respective ones of the number of simultaneously executable threads and instruction distributing unit 406 is configured to simultaneously distribute the instructions of different threads to their respective corresponding comparator groups for data dependency detection, it becomes possible to take advantage of the mutually independent characteristics of the instructions between different threads of the SMT functionality to improve the CPU instruction throughput by increasing the renaming instruction width without increasing the number of comparators.

Increasing the renaming instruction width with an SMT-enabled CPU is described above but in some instances, the SMT functionality of the CPU (or other device) needs to be disabled. In some embodiments, the SMT functionality of the CPU can be configured to be disabled or enabled when the CPU is restarted. For example, the SMT functionality of the CPU (or other device) can be disabled if an operator wishes to ensure the execution efficiency of a single thread. In situations where the SMT functionality has been disabled, the plurality of comparators in instruction comparing unit 408 is not divided into groups but is instead utilized as a single group that corresponds to the single thread of the SMT-disabled CPU 400. Where the SMT functionality is disabled, instruction distributing unit 406 is configured to distribute the decoded set of instructions belonging to a single thread that was output by instruction decoding unit 404 to the single group of comparators in instruction comparing unit 408. This single comparator group is configured to perform data dependency detection between the decoded set of instructions belonging to the single thread. For example, if the SMT-disabled CPU 400 includes 12 comparators and the single thread is configured to execute four instructions in one clock cycle, then all 12 comparators of instruction comparing unit 408 are merged into one group. Instruction distributing unit 406 is configured to send the decoded set of instructions belonging to the single thread to instruction comparing unit 408. Instruction comparing unit 408 is configured to use the 12 comparators to detect data dependency of the four instructions of the single thread within one clock cycle.

As described in the above examples, if CPU 400 is SMT-enabled and is configured to simultaneously execute two threads, then 12 comparators of CPU 400 could be utilized to perform data dependency detection on six instructions between the two threads. However, if CPU 400 is SMT-disabled and is configured to a single thread, then 12 comparators of CPU 400 could be utilized to perform data dependency on only four instructions. As such, by using various embodiments described herein, the same 12 comparators can be utilized to increase the renaming instruction width in an SMT-enabled CPU 400. Because all 12 comparators are utilized to perform data dependency regardless of whether the SMT functionality is enabled or disabled, the comparator utilization of CPU 400 is fully saturated.

In another example, an SMT-enabled CPU 400 is configured to simultaneously execute up to two threads and instruction comparing unit 408 comprises 24 comparators. If the SMT function is disabled, 20 of the comparators would need to be used to perform the data dependency detection of five instructions ($5 \times 5 - 5 = 20$) belonging to the single thread. However, when the SMT function is enabled, the 24 comparators are divided into two groups of 12 comparators each and each group of 12 comparators can be used to detect the data dependency of four instructions belonging to a corresponding thread. Thus, by enabling the SMT functionality in CPU 400, the renaming instruction width is increased from five to eight instructions without adding additional comparators. However, comparing this example of CPU 400 having 24 comparators to 12 comparators of the previous examples, it can be seen that four comparators are idle when the SMT function is disabled and therefore, the comparator utilization of CPU 400 fails to achieve full saturation.

Figure 7:
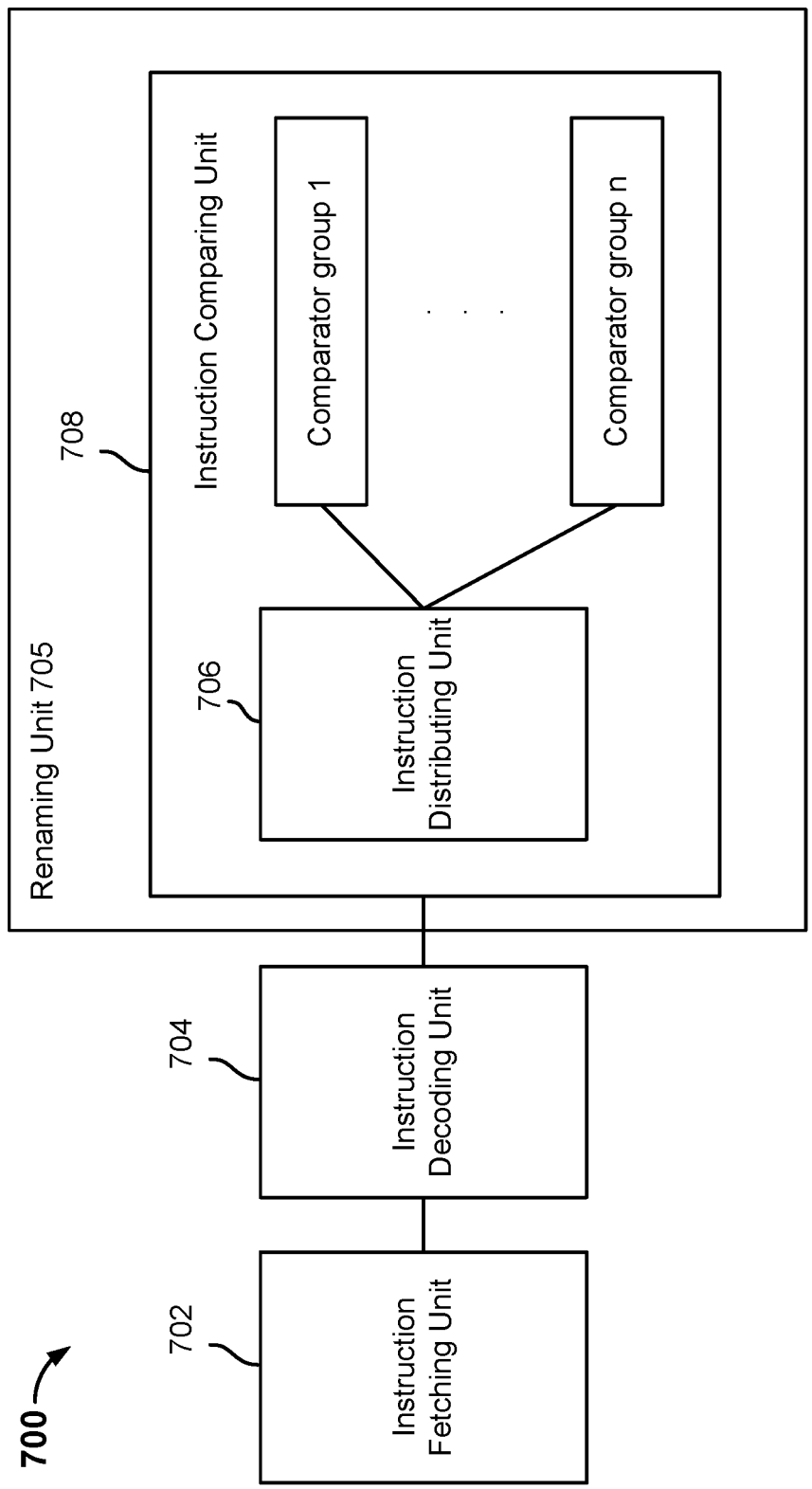
FIG. 7 is a diagram showing an embodiment of a central processing unit (CPU) configured to detect data dependencies of instructions belonging to one or more threads.

FIG. 7 is a diagram showing an embodiment of a central processing unit (CPU) configured to detect data dependencies of instructions belonging to one or more threads. In various embodiments, CPU 700 includes SMT functionality, which can be enabled or disabled. CPU 700 includes instruction fetching unit 702, instruction decoding unit 704, and renaming unit 705. Renaming unit 705 includes instruction comparing unit 708. Instruction comparing unit 708 includes instruction distributing unit 706. Each of instruction fetching unit 702, instruction decoding unit 704, renaming unit 705, instruction distributing unit 706, and instruction comparing unit 708 is implemented using software, hardware, or a combination of software and hardware. Instruction comparing unit 708 includes a plurality of comparators that is divided into n groups of comparators. CPU 700 is implemented similarly to CPU 400 of FIG. 4 and can be used alternatively to CPU 400 of FIG. 4. CPU 700 differs from CPU 400 of FIG. 4 in that instruction distributing unit 706 and the plurality of comparators of renaming unit 705 are integrated into a single unit, instruction comparing unit 708. Otherwise, instruction fetching unit 702, instruction decoding unit 704, instruction distributing unit 706, and instruction comparing unit 708 are implemented similarly to instruction fetching unit 402, instruction decoding unit 404, instruction distributing unit 406, and instruction comparing unit 408 of CPU 400 of FIG. 4. In some embodiments, process 300 of FIG. 3 is implemented at CPU 700 when CPU 700 is SMT-enabled.

Figure 8:
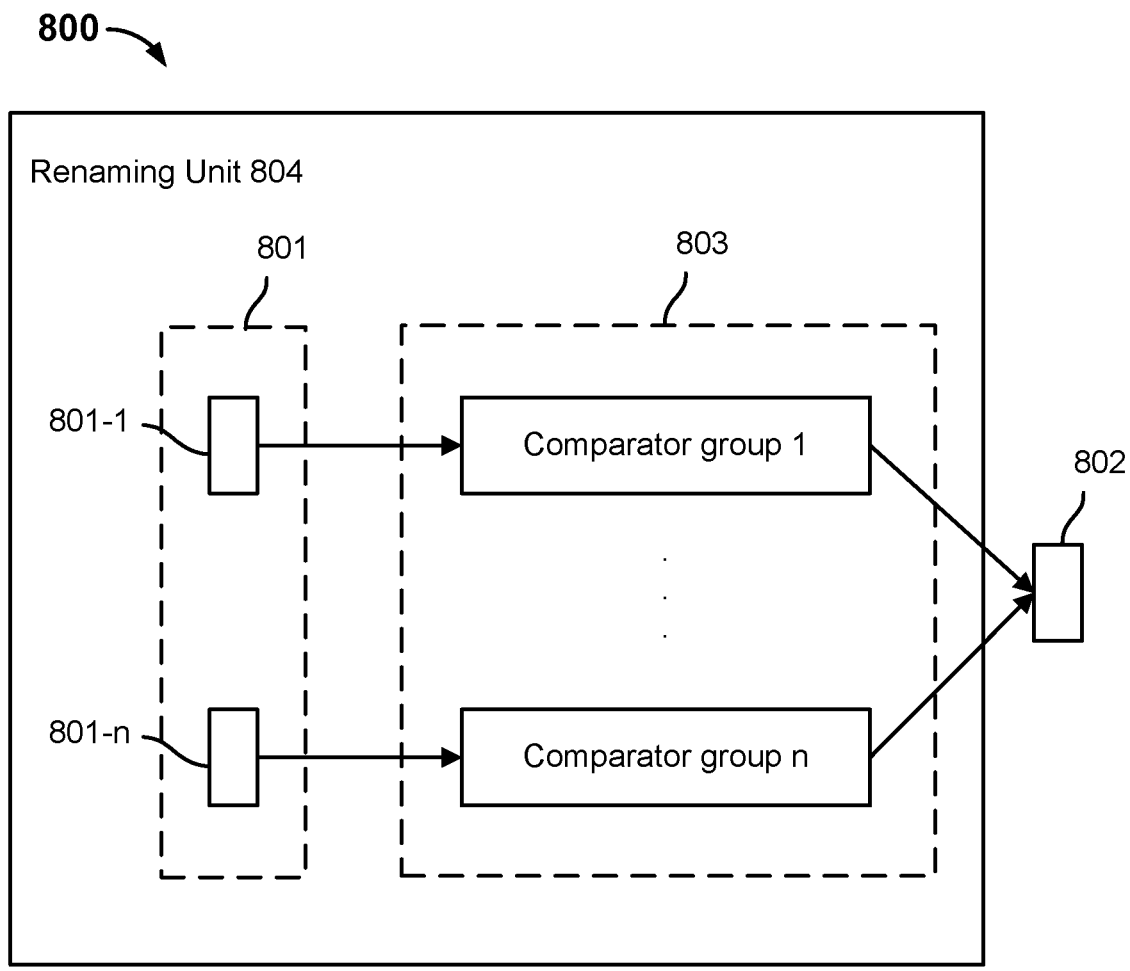
FIG. 8 is a diagram showing an embodiment of a device configured to detect data dependencies of instructions belonging to one or more threads.

FIG. 8 is a diagram showing an embodiment of a device configured to detect data dependencies of instructions belonging to one or more threads. In various embodiments, device 800 includes SMT functionality, which can be enabled or disabled. Device 800 is implemented similarly to CPU 400 of FIG. 4 and can be used alternatively to CPU 400 of FIG. 4. In some embodiments, process 300 of FIG. 3 is implemented at device 800 when device 800 is SMT-enabled. Device 800 includes renaming unit 804, which includes instruction input interfaces 801 (which includes instruction input interfaces 801-1 through 801-*n*), result output interfaces 802, and plurality of comparators 803. Plurality of comparators 803 is divided into n groups, where n is the number of threads that can be simultaneously executed by device 800. When device 800 is SMT-enabled, each group of comparators is configured to simultaneously perform data dependency detection between instructions of a corresponding thread. Different groups of comparators can be simultaneously used to perform data dependency detection between instructions of different threads.

Instruction input interface 801 comprises n multiple input interfaces, 801-1 through 801-*n*, where each instruction input interface transmits instructions belonging to a thread into a corresponding group of comparators of plurality of comparators 803. Different instruction input interfaces are connected to different groups of comparators. Result output interfaces 802 are connected to plurality of comparators 803 and are configured to output the determination results of plurality of comparators 803.

For example, device 800 includes 12 comparators and can simultaneously execute up to two threads, Thread 1 and Thread 2, when device 800 is SMT-enabled. The SMT-based device 800 would then include two instruction input interfaces and plurality of comparators 803 would be divided into two groups, where each group includes six comparators. Instruction input interfaces 801 would be configured to receive decoded sets of instructions from an instruction distributing unit (not shown in diagram FIG. 8) or a unit having a similar function, and the decoded sets of instructions would be transmitted to corresponding comparator groups. Specifically, the first instruction input interface would receive the decoded set of instructions belonging to Thread 1 and then transmit them to the group of comparators corresponding to Thread 1 and the second instruction input interface would receive the decoded set of instructions belonging to Thread 2 and then transmit them to the group of comparators corresponding to Thread 2. The group of comparators corresponding to Thread 1 could use six comparators to detect data dependency between the three instructions of Thread 1. The group of comparators corresponding to Thread 2 could use six comparators to detect data dependency between the three instructions of Thread 2. Moreover, the detection results of the two groups of comparators are output through the result output interfaces 802. As such, when device 800 is SMT-enabled, it can simultaneously detect data dependencies of six instructions.

However, in the event where device 800 is SMT-disabled, only one of the two instruction input interfaces will be used. That is, the decoded set of instructions from the single thread is input from one instruction input interface. Moreover, the 12 comparators are merged into one group and can simultaneously detect data dependencies of up to four instructions input from the one instruction input interface.

While the example above described that the SMT-enabled device 800 is configured to simultaneously execute up to two threads and include 12 comparators, in other examples and in actual implementation, device 800 may be configured to simultaneously execute up to more than two threads and/or include more or fewer than 12 comparators. However, regardless of how many threads the SMT-enabled device 800 is configured to execute up to and/or how many comparators the SMT-enabled device 800 is configured to include, so long as the comparators of plurality of comparators 803 are divided into multiple groups that correspond to respective ones of the number of simultaneously executable threads, it becomes possible to take advantage of the mutually independent characteristics of the instructions between different threads of the SMT functionality to improve the device instruction throughput by increasing the renaming instruction width without increasing the number of comparators.

Figure 9:
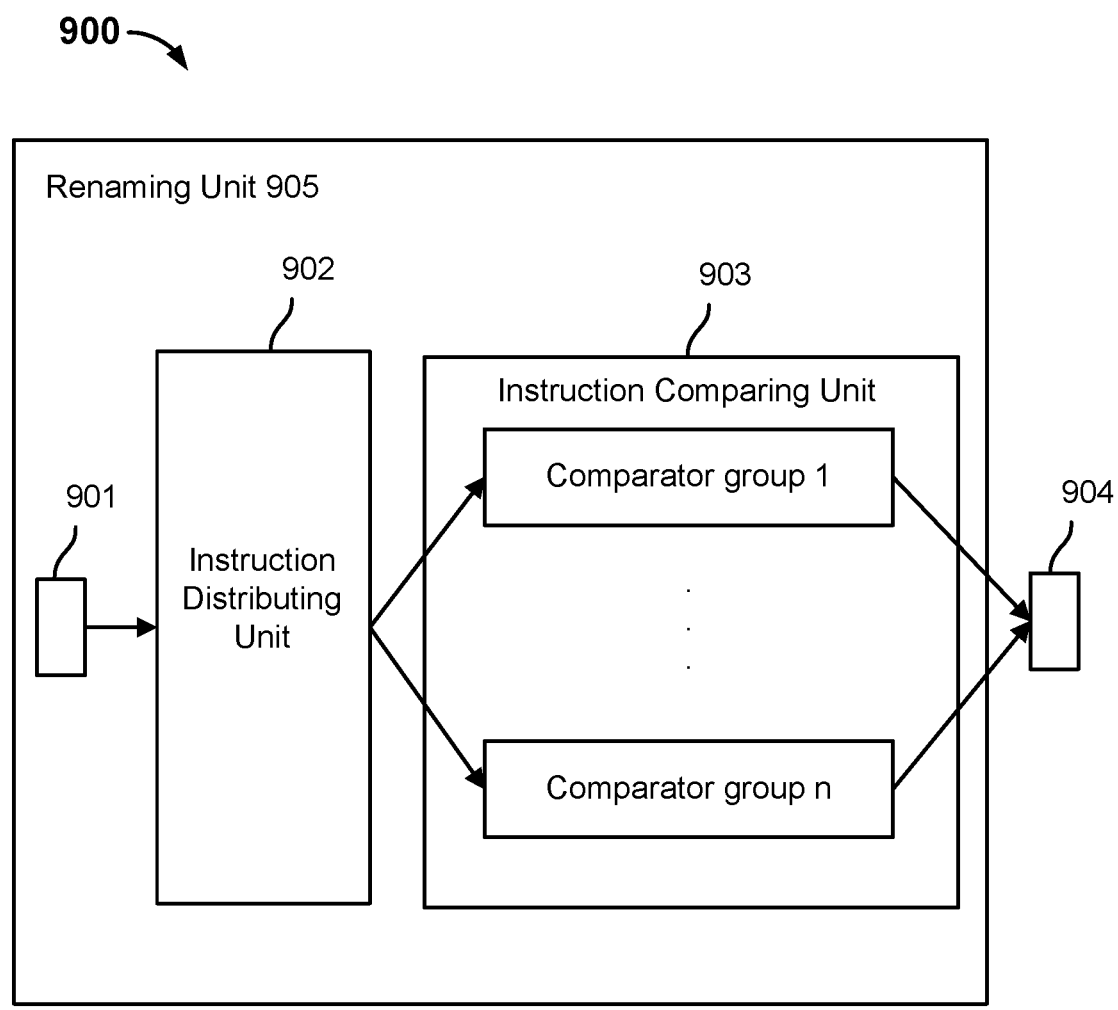
FIG. 9 is a diagram showing an embodiment of a device configured to detect data dependencies of instructions belonging to one or more threads.

FIG. 9 is a diagram showing an embodiment of a device configured to detect data dependencies of instructions belonging to one or more threads. In various embodiments, device 900 includes SMT functionality, which can be enabled or disabled. Device 900 is implemented similarly to CPU 400 of FIG. 4 and can be used alternatively to CPU 400 of FIG. 4. In some embodiments, process 300 of FIG. 3 is implemented at device 900 when device 900 is SMT-enabled. Device 900 includes renaming unit 905, which includes instruction input interfaces 901, instruction distributing unit 902, instruction comparing unit 903, and result output interfaces 904. The connections between the units are as shown in FIG. 9.

Instruction comparing unit 903 comprises a plurality of comparators. The plurality of comparators is divided into n mutually independent groups, where n is the number of threads that can be simultaneously executed by device 900. When device 900 is SMT-enabled, each group of comparators is configured to perform data dependency detection between instructions of a corresponding thread. Different groups of comparators can be simultaneously used to perform data dependency detection between instructions of different threads.

Instruction distributing unit 902 comprises at least two instruction distributing interfaces, where each instruction distributing interface is connected to a corresponding one of the groups of comparators in instruction comparing unit 903. Different instruction distributing interfaces are connected to different groups of comparators. There are as many instruction distributing interfaces in instruction distributing unit 902 as there are groups of comparators in instruction comparing unit 903.

Instruction distributing unit 902 is configured to fetch decoded sets of instructions whose data dependency is to be tested from instruction input interfaces 901 and send a decoded set of instructions belonging to a thread to a corresponding group of comparators via a corresponding instruction distributing interface.

For example, device 900 includes 12 comparators and can simultaneously execute up to two threads, Thread 1 and Thread 2, when device 900 is SMT-enabled. Instruction input interfaces 901 would transmit decoded instructions from a decoding unit (not shown) to instruction distributing unit 902. Instruction distributing unit 902 would comprise two instruction distributing interfaces, which are separately connected to two groups of comparators in instruction comparing unit 903. Instruction distributing unit 902 would distribute the decoded set of instructions belonging to Thread 1 via a corresponding distributing interface to the comparator group corresponding to Thread 1 and distribute the decoded set of instructions belonging to Thread 2 via a corresponding distributing interface to the comparator group corresponding to Thread 2. The two groups of comparators each includes six comparators, which are configured to perform data dependency detection of the three instructions belonging to Thread 1 and to Thread 2, respectively. As such, when device 900 is SMT-enabled, it can simultaneously detect data dependencies of six instructions.

However, in the event where device 900 is SMT-disabled, only one of the two instruction input interfaces will be used. That is, the decoded set of instructions from the single thread is input from one instruction input interface. Moreover, the 12 comparators are merged into one group and can simultaneously detect data dependencies of up to four instructions input from the one instruction input interface.

While the example above described that the SMT-enabled device 900 is configured to simultaneously execute up to two threads and include 12 comparators, in other examples and in actual implementation, device 900 may be configured to simultaneously execute up to or more than two threads and/or include more or fewer comparators than 12. However, regardless of how many threads the SMT-enabled device 900 is configured to execute up to and/or how many comparators the SMT-enabled device 900 is configured to include, so long as the comparators of instruction comparing unit 903 is divided into multiple groups that correspond to respective ones of the number of simultaneously executable threads, it becomes possible to take advantage of the mutually independent characteristics of the instructions between different threads of the SMT functionality to improve the device instruction throughput by increasing the renaming instruction width without increasing the number of comparators.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The units may be implemented on a single device or distributed across multiple devices. The functions of the units may be merged into one another or further split into multiple sub-units.

Although the present application is disclosed using the preferred embodiments above, they cannot be used to limit the present application. Any person with skill in the art can make possible alterations and modifications without departing from the spirit and scope of the present application. Therefore, the scope of protection of the present application shall be the scope defined by the claims of the present application.

In one typical configuration, the computation equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer readable media include permanent, non-permanent, mobile, and non-mobile media that can be used to store information by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media (transitory media), such as modulated data signals and carrier waves.

A person skilled in the art should understand that the embodiments of the present application can be provided as methods, systems or computer program products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A simultaneous multithreading (SMT)-capable device, comprising:
one or more processors configured to:
determine that the SMT-capable device is enabled to perform multithreading;
in response to the determination that the SMT-capable device is enabled to perform multithreading:
divide a plurality of comparators associated with the SMT-capable device into a plurality of groups of comparators corresponding to respective ones of a plurality of threads associated with the enabled SMT-capable device;
assign a first group of comparators to a first thread included in the plurality of threads and assign a second group of comparators to a second thread included in the plurality of threads;
obtain from one or more queues of decoded instructions a first set of instructions that is tagged with a first identifier associated with the first thread;
distribute the first set of instructions to the first group of comparators corresponding to the first thread based at least in part on the first identifier associated with the first thread;
obtain from the one or more queues of decoded instructions a second set of instructions that is tagged with a second identifier associated with the second thread;
distribute the second set of instructions to the second group of comparators corresponding to the second thread based at least in part on the second identifier associated with the second thread; and
perform data dependency detection on the first set of instructions associated with the first thread using the first group of comparators and perform data dependency detection on the second set of instructions associated with the second thread using the second group of comparators;
receive an indication that the SMT-capable device has been restarted;
determine that the SMT-capable device is disabled from performing multithreading and is configured to perform a single thread; and in response to the determination that the SMT-capable device is disabled from performing multithreading and is configured to perform the single thread:
  merge the first group of comparators and the second group of comparators back into the plurality of comparators;
  assign the plurality of comparators to the single thread;
  distribute a third set of instructions to the plurality of comparators corresponding to the single thread; and
  perform data dependency detection on the third set of instructions using the plurality of comparators; and
a memory coupled to the one or more processors and configured to provide instructions to the one or more processors.

2. The SMT-capable device of claim 1, wherein the SMT-capable device comprises a central processing unit (CPU).

3. The SMT-capable device of claim 1, wherein the enabled SMT-capable device is configured to execute at least two threads.

4. The SMT-capable device of claim 1, wherein the first set of instructions associated with the first thread comprises an earlier instruction and a later instruction, and wherein a comparator of the first group of comparators is configured to:
  receive a destination operand reference associated with the earlier instruction;
  receive a source operand reference associated with the later instruction;
  perform data dependency on the earlier instruction and the later instruction by comparing the destination operand reference associated with the earlier instruction to the source operand reference associated with the later instruction;
  in response to a first determination that the destination operand reference associated with the earlier instruction is the same as the source operand reference associated with the later instruction, output a determination indicating that data dependency exists between the earlier instruction and the later instruction; and
  in response to a second determination that the destination operand reference associated with the earlier instruction is not the same as the source operand reference associated with the later instruction, output a determination indicating that data dependency does not exist between the earlier instruction and the later instruction.

5. The SMT-capable device of claim 1, wherein each of the plurality of groups of comparators comprises a same number of comparators.

6. The SMT-capable device of claim 1, further comprising fetching instructions associated with the plurality of threads from the one or more queues of decoded instructions.

7. The SMT-capable device of claim 1, further comprising using polling to decode instructions associated with the plurality of threads.

8. The SMT-capable device of claim 1, wherein the one or more processors are further configured to:
  determine using the first group of comparators that data dependency does not exist between a first instruction and a second instruction from the first set of instructions; and
  use the first thread to execute the first instruction and the second instruction at least partially concurrently.

9. The SMT-capable device of claim 1, wherein the first set of instructions that is tagged with the first identifier associated with the first thread and the second set of instructions that is tagged with the second identifier associated with the second thread are mutually independent.

10. A method, comprising:
  determining that a simultaneous multithreading (SMT)-capable device is enabled to perform multithreading;
  in response to the determination that the SMT-capable device is enabled to perform multithreading:
    dividing a plurality of comparators associated with the SMT-capable device into a plurality of groups of comparators corresponding to respective ones of a plurality of threads associated with the enabled SMT-capable device;
    assigning a first group of comparators to a first thread included in the plurality of threads and assigning a second group of comparators to a second thread included in the plurality of threads;
    obtaining from one or more queues of decoded instructions a first set of instructions that is tagged with a first identifier associated with the first thread;
    distributing the first set of instructions to the first group of comparators corresponding to the first thread based at least in part on the first identifier associated with the first thread;
    obtaining from the one or more queues of decoded instructions a second set of instructions that is tagged with a second identifier associated with the second thread;
    distributing the second set of instructions to the second group of comparators corresponding to the second thread based at least in part on the second identifier associated with the second thread; and
    performing data dependency detection on the first set of instructions associated with the first thread using the first group of comparators and performing data dependency detection on the second set of instructions associated with the second thread using the second group of comparators;
  receiving an indication that the SMT-capable device has been restarted;
  determining that the SMT-capable device is disabled from performing multithreading and is configured to perform a single thread;
  in response to the determination that the SMT-capable device is disabled from performing multithreading and is configured to perform the single thread:
    merging the first group of comparators and the second group of comparators back into the plurality of comparators;
    assigning the plurality of comparators to the single thread;
    distributing a third set of instructions to the plurality of comparators corresponding to the single thread; and
    performing data dependency detection on the third set of instructions using the plurality of comparators.

11. The method of claim 10, wherein the SMT-capable device comprises a central processing unit (CPU).

12. The method of claim 10, wherein the SMT-capable device is configured to execute at least two threads.

13. The method of claim 10, wherein the first set of instructions associated with the first thread comprises an earlier instruction and a later instruction, and wherein a comparator of the first group of comparators is configured to:

receive a destination operand reference associated with the earlier instruction;

receive a source operand reference associated with the later instruction;

perform data dependency on the earlier instruction and the later instruction by comparing the destination operand reference associated with the earlier instruction to the source operand reference associated with the later instruction;

in response to a first determination that the destination operand reference associated with the earlier instruction is the same as the source operand reference associated with the later instruction, output a determination indicating that data dependency exists between the earlier instruction and the later instruction; and in response to a second determination that the destination operand reference associated with the earlier instruction is not the same as the source operand reference associated with the later instruction, output a determination indicating that data dependency does not exist between the earlier instruction and the later instruction.

14. The method of claim 10, wherein each of the plurality of groups of comparators comprises a same number of comparators.

15. The method of claim 10, further comprising fetching instructions associated with the plurality of threads from the one or more queues of decoded instructions.

16. The method of claim 10, further comprising using polling to decode instructions associated with the plurality of threads.

17. A computer program product, the computer program product being embodied in a non-transitory computer readable storage medium and comprising computer instructions for:

determining that a simultaneous multithreading (SMT)-capable device is enabled to perform multithreading;

in response to the determination that the SMT-capable device is enabled to perform multithreading:

dividing a plurality of comparators associated with a SMT-capable device into a plurality of groups of comparators corresponding to respective ones of a plurality of threads associated with the enabled SMT-capable device;

assigning a first group of comparators to a first thread included in the plurality of threads and assigning a second group of comparators to a second thread included in the plurality of threads;

obtaining from one or more queues of decoded instructions a first set of instructions that is tagged with a first identifier associated with the first thread;

distributing the first set of instructions to the first group of comparators corresponding to the first thread based at least in part on the first identifier associated with the first thread;

obtaining from the one or more queues of decoded instructions a second set of instructions that is tagged with a second identifier associated with the second thread;

distributing the second set of instructions to the second group of comparators corresponding to the second thread based at least in part on the second identifier associated with the second thread; and performing data dependency detection on the first set of instructions associated with the first thread using the first group of comparators and performing data dependency detection on the second set of instructions associated with the second thread using the second group of comparators;

receiving an indication that the SMT-capable device has been restarted;

determining that the SMT-capable device is disabled from performing multithreading and is configured to perform a single thread; and in response to the determination that the SMT-capable device is disabled from performing multithreading and is configured to perform the single thread:

merging the first group of comparators and the second group of comparators back into the plurality of comparators;

assigning the plurality of comparators to the single thread;

distributing a third set of instructions to the plurality of comparators corresponding to the single thread; and performing data dependency detection on the third set of instructions using the plurality of comparators.

* * * * *